: US005926510A

United States Patent [19]
Suzuki

[11] Patent Number: 5,926,510
[45] Date of Patent: Jul. 20, 1999

[54] TRANSMITTER APPARATUS, RECEIVER APPARATUS, TRANSMITTING METHOD AND RECEIVING METHOD FOR INTERLEAVING AND VARYING AN ANTENNA DIRECTIONAL PATTERN

[75] Inventor: Mitsuhiro Suzuki, Chiba, Japan

[73] Assignee: Sony Corporation, Tokyo, Japan

[21] Appl. No.: 08/784,070

[22] Filed: Jan. 17, 1997

Related U.S. Application Data

[30] Foreign Application Priority Data

Jan. 29, 1996 [JP] Japan .................................. 8-035521

[51] Int. Cl.[6] .................................................. H04B 15/00
[52] U.S. Cl. .......................... 375/285; 375/296; 375/341; 342/368
[58] Field of Search ..................................... 375/285, 341, 375/343, 200, 295, 296; 455/33.1, 33.3, 52.1, 52.2, 52.3, 272, 273, 276.1, 277.1, 278.1, 279.1, 283, 284; 342/368

[56] References Cited

U.S. PATENT DOCUMENTS

| 3,657,656 | 4/1972 | Cooper | 375/309 |
|---|---|---|---|
| 5,339,041 | 8/1994 | Nitardy | 375/268 |
| 5,438,590 | 8/1995 | Tzukerman et al. | 375/37 |
| 5,442,646 | 8/1995 | Chadwick et al. | 371/43 |
| 5,541,552 | 7/1996 | Suzuki et al. | 329/307 |
| 5,546,429 | 8/1996 | Chiasson et al. | 375/94 |
| 5,577,265 | 11/1996 | Wheatley, III | 455/33.3 |

*Primary Examiner*—Don N. Vo
*Attorney, Agent, or Firm*—Jay H. Maioli

[57] ABSTRACT

In a radio communication system and a transmitting and receiving system for broadcasting, high-speed fading can be generated intentionally by changing the order of data in each specified period by interleaving and transmitting it while changing the emission pattern of a transmission antenna (9) on a cycle faster than the specified period. As a result, burst errors caused by the deterioration of a reception level due to fading can be distributed as random errors by de-interleaving so that radio communication can be performed in good condition. In the above manner, a radio communication system capable of radio-communicating in good condition by preventing the bad influence of fading can be realized with a simple structure.

15 Claims, 6 Drawing Sheets

TRANSMITTER APPARATUS, RECEIVER APPARATUS, TRANSMITTING METHOD AND RECEIVING METHOD FOR INTERLEAVING AND VARYING AN ANTENNA DIRECTIONAL PATTERN

BACKGROUND OF THE INVENTION

FIELD OF THE INVENTION

The present invention relates to a radio communication system and a radio communication method, and is applicable to a mobile radio communication system such as a digital cordless telephone system and a digital portable telephone system for example.

DESCRIPTION OF THE RELATED ART

The air is a transmission line of radio communication, the condition of which always varies by receiving the effects such as natural phenomenon and construction. Such variation in the air condition is called "fading" in general. Generation of the fading causes deterioration in transmission quality due to lowering of the intensity of a radio wave at the receiving point and the change of a transmission characteristic. For this reason, in general digital mobile radio communication systems, the measures described below are adopted to prevent deterioration in transmission quality due to fading.

On the transmitting side, transmission data is coded, e.g., convolutionally coded, and rearrayed by interleaving, and the transmission data is modulated and transmitted. On the other hand, on the receiving side, the reception signal is demodulated and de-interleaved to return the data sequence and decoded, e.g., Viterbi-decoded so as to restore the transmission data. Thereby, in the mobile radio communication system, burst errors generated by lowering the instant reception level due to fading can be distributed as random errors; thus data can be transmitted with a small number of errors by correcting errors by Viterbi decoding.

In the mobile radio communication system in which the above measures are adopted, if the motion speed of a mobile radio station slows down, low-speed fading is generated and lowering of reception level extends for a long time. As a result, burst errors longer than an interleave length may be generated and errors may not be corrected. Thereby, the transmission quality often deteriorates.

More particularly, in the mobile radio communication system such as a cordless telephone, the above problem is apt to occur because the motion speed of a mobile radio station is slow. To solve this problem, longer interleave length is necessary, thus memory capacity becomes large and the device becomes expensive. Further, naturality in communication may be lost due to delay by interleaving.

Furthermore, when the mobile radio station stops moving, if it stopped at a dead point to which signal power almost does not reach due to fading unfortunately, the mobile radio station may be in an uncommunicable state.

SUMMARY OF THE INVENTION

In view of the foregoing, an object of the present invention is to provide a radio communication system and a radio communication method capable of radio-communicating in good condition with a simple structure by preventing a bad influence by fading.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of the present invention will be described with reference to the accompanying drawings.

Figure 1:
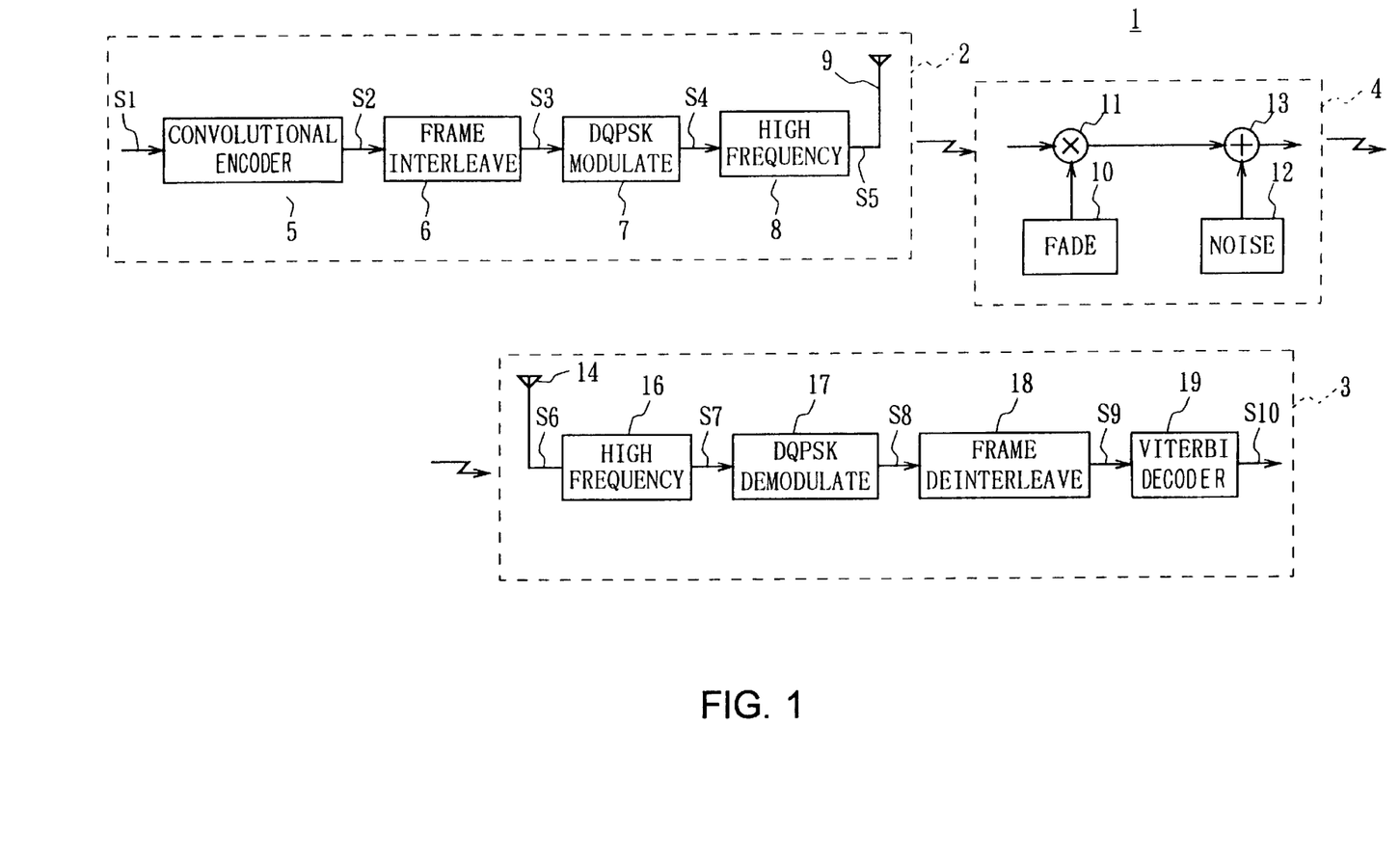
FIG. 1 is a block diagram showing the structure of a digital cordless telephone system according to an embodiment of the present invention.

Referring to FIG. 1, a reference numeral 1 generally designates a digital cordless telephone system applying the present invention. The system 1 is mainly composed of a base station 2 and a mobile station 3. A transmission line 4 shown in FIG. 1 equivalently represents the air propagating radio wave. FIG. 1 only shows the direction from the base station 2 to the mobile station 3, that is the down direction.

Further, in the digital cordless telephone system 1, data transmission speed is 32 [kbps], the frame structure of data is 192 [bit] (about 5 [ms]), interleaving is performed in each unit, the differential quadrature phase shift keying (that is, DQPSK) and delayed detection are applied for modulation and demodulation, and the convolutional coding with the constraint length of 7 and at the coding ratio of ½ and the Soft decision-Viterbi decoding are applied for coding and decoding.

In the base station 2, transmission data S1 such as an audio which is 192 [bit] per frame is first input to a convolutional encoder 5. The convolutional encoder 5 convolutionally codes the input transmission data S1 with the constraint length of 7 and at the coding rate of ½ (that is, performs exclusive OR operations for the data from the current data to the data before 6 bits by means of a shift register with 7 stages and two exclusive ORs), and outputs thus obtained transmission data S2 which is 384 symbols per frame to a frame interleaving circuit 6. The frame interleaving circuit 6 changes the order of the input transmission data S2 in each frame at random, and outputs thus obtained transmission data S3 to a DQPSK modulator 7.

The DQPSK modulator 7 DQPSK-modulates the input transmission data S3 and outputs thus obtained transmission signal S4 to a high frequency circuit 8. The high frequency circuit 8 frequency-converts the input transmission signal S4 to transmission signal S5 having a predetermined bandwidth and amplifies it up to a desired power. The transmission signal S5 is emitted into the air via an antenna 9.

In the air in which, the transmission signal S5 receives effects of fading and mixing of noise in general. That is, the air the transmission signal S5 is propagated is equivalent to the transmission line 4 shown in FIG. 1. Accordingly, the transmission signal S5 emitted in the air receives the effects from a fading generation origin 10 by a multiplier 11 in the form of multiplication and also receives the noise from a noise origin 12 by an adder 13 in the form of addition.

The transmission signal S5 propagated in the above transmission line 4 is received by an antenna 14 of the mobile station 3. Reception signal S6 obtained by the antenna 14 is input to a high frequency circuit 16 to amplify up to a desired power and frequency-converted to the base band bandwidth. The obtained reception signal S7 is input to a DQPSK demodulator 17. The DQPSK demodulator 17 is a device for demodulating the signal modulation executed on the transmitting side. The demodulator 17 restores the reception data S8 by delay detecting the input reception signal S7 and outputs it to a frame de-interleaving circuit 18.

The frame de-interleaving circuit 18 is a device for returning the order of data which has been changed on the transmitting side. The circuit 18 rearrays the input reception data S8 in the opposite way as the transmission side to return the data sequence and outputs thus obtained reception data S9 to a Viterbi decoder 19.

The Viterbi decoder 19 is a device for decoding the convolutional code which has been executed on the transmitting side. The decoder 19 Viterbi-decodes the reception data S9. That is, the torelis of the convolutional code is considered by storing the reception data by a predetermined bit and the most reliable state is presumed among all the state shifting of the data so that the data is decoded to the data having no error. Reception data S10 which is 192 [bit] per frame is restored. Thereby, the transmission data S1 transmitted from the transmission side is finally restored as the reception data S10.

Here, in the digital cordless telephone system 1, the emission pattern of the antenna 9 which is provided at the base station 2 is electrically changed at random so that high-speed fading shorter than the interleave length (in this case, which is one frame length described as above) is generated intentionally to control the generation of low-speed fading longer than the interleave length; thus fine radio communication can be performed.

Figure 2:
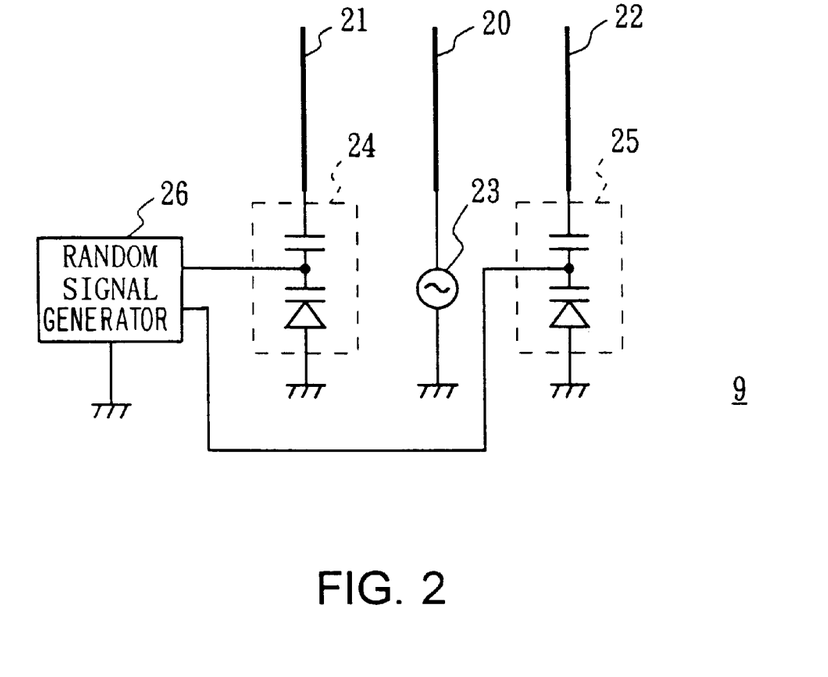
FIG. 2 is a connection diagram illustrating the structure of an antenna in which the emission pattern is varied.

For this purpose, the antenna 9 is structured as shown in FIG. 2 in which the emission pattern can be varied at random. That is, as shown in FIG. 2, the antenna 9 includes three conductors: an emittive conductor 20 for emitting transmission signal S5; a reflection conductor 21 for reflecting the radio wave emitted from the emittive conductor 20; and a waveguide conductor 22 for intensifying the emitted radio wave in a predetermined direction. The equivalent electric length of the reflection conductor 21 and the waveguide conductor 22 is varied to change the m utual-impedance between the conductors. Thereby, the emission pattern of the an tenna can be varied.

Concretely, the emittive conductor 20 is the antenna section for transmitting the transmission signal S5 as described above to which the generation origin of the transmission signal S5 (in this case, the high frequency circuit 8 described above) is connected.

On the other hand, the reflection conductor 21 and waveguide 2wconductor 22 positioned at the periphery of the emittive conductor 20 are grounded via reactance elements 24 and 25 (here, these are varicaps) respectively. The reactance of the reactance elements is varied by changing the applied voltage supplied to the reactance elements 24 and 25 by a random signal generator 26; so that the equivalent electric length of the reflection conductor 21 and the waveguide conductor 22 can be varied.

If the equivalent electric length of the reflection conductor 21 and the waveguide conductor 22 is varied at random by the random signal generator 26, the mutual-impedance between conductors is varied at random, so that the reflection and waveguiding generated by the reflection conductor 21 and waveguide conductor 22 occur at random complicatedly. As a result, in the antenna 9, the emission pattern of the antenna varies at random complicatedly.

Note that, in this case, the cycle of variation in applied voltage which is supplied from the random signal generator 26 is varied faster than the interleave length so that the emission pattern is varied at high speed. Thereby, high-speed fading shorter than the interleave length can be realized.

Further, if the applied voltage supplied to the reflection conductor 21 and waveguide conductor 22 is varied at random so as to vary the equivalent electric length of the above conductors, the reflection conductor 21 can be operated as a waveguide conductor and the waveguide conductor 22 can be operated as a reflection conductor in electric length.

The temporal variation in fading when the emission pattern is varied by means of the antenna 9 is described.

Figure 3:
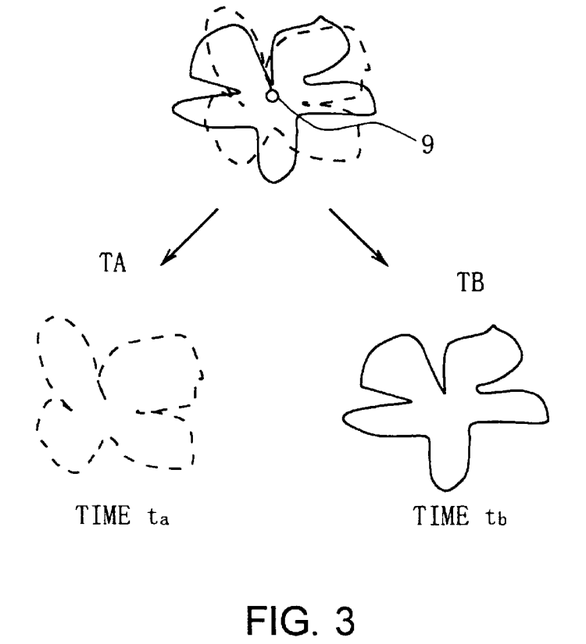
FIG. 3 is a schematic diagram showing an example of variation in an emission pattern on the transmitting side when the emission pattern of the antenna is varied.
Figure 4:
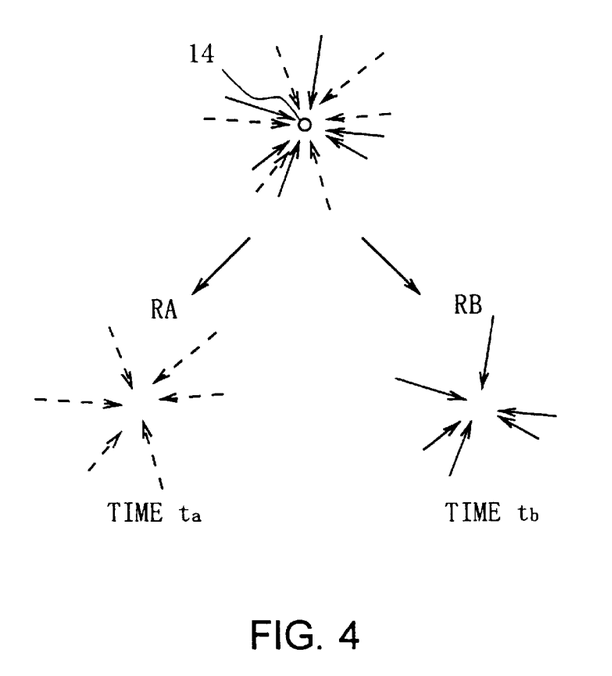
FIG. 4 is a schematic diagram showing an example of a variation of distribution pattern on the receiving side when the emission pattern of the antenna is varied.
Figure 5:
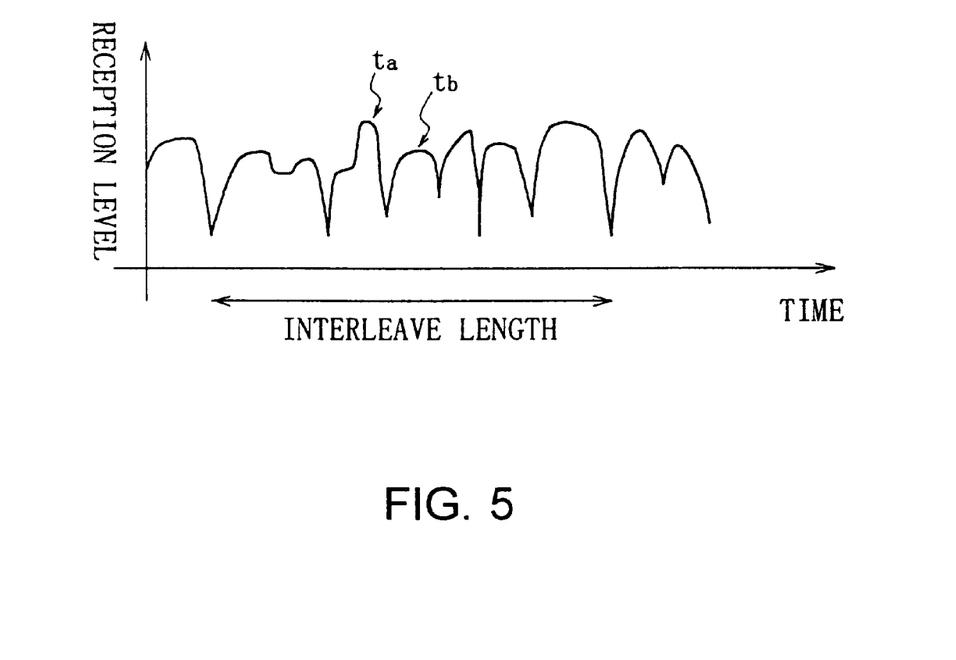
FIG. 5 is a schematic diagram showing a temporal variation in fading when the emission pattern of the antenna is varied.

In the case where the emission pattern of the antenna 9 is varied by varying the equivalent electric length of the reflection conductor 21 and waveguide conductor 22, as shown in FIG. 3, assuming that at the time point $t_a$ there is an emission pattern TA and at the time point $T_b$ there is an emission pattern TB, the radio wave received on the receiving side is changed into distribution patterns RA and RB as shown in FIG. 4 due to the reflection and distribution in the transmission line. The variation of the reception level by fading is caused by random addition on reflection wave and distribution wave. Thus the reception level at the time point $t_a$ and time point $t_b$ is varied as shown in FIG. 5. Therefore, by changing the emission pattern on the transmitting side, fading can be varied intentionally.

At this time, if the emission pattern is varied on the cycle faster than the interleave length, the point at which the reception level extremely lowers due to fading can be shorter than the interleave length as shown in FIG. 5. with the above, if the point at which the reception level is extremely lower than the interleave length can be shorter than the interleave length, burst error generated in that point can be distributed as random errors by de-interleaving; thus the transmission quality can be kept in good condition.

Practically, the above is applied not only with error distribution by interleaving and de-interleaving but also with error correction by convolutional coding and Viterbi decoding so that the bit error rate can be improved and the transmission quality can be kept in better condition.

Note that, if the lower part of the reception level becomes longer than the interleave length by fading, the burst error cannot be absorbed by de-interleaving and the error cannot be corrected by convolutional coding and Viterbi decoding, thus the transmission quality has been deteriorated. In this case, however, such deterioration does not occur because the lower part of the reception level becomes shorter than the interleave length.

The case in which high-speed fading is generated intentionally, the transmission quality can be kept in good condition, is described with reference to the result examined by computer simulation.

Figure 6:
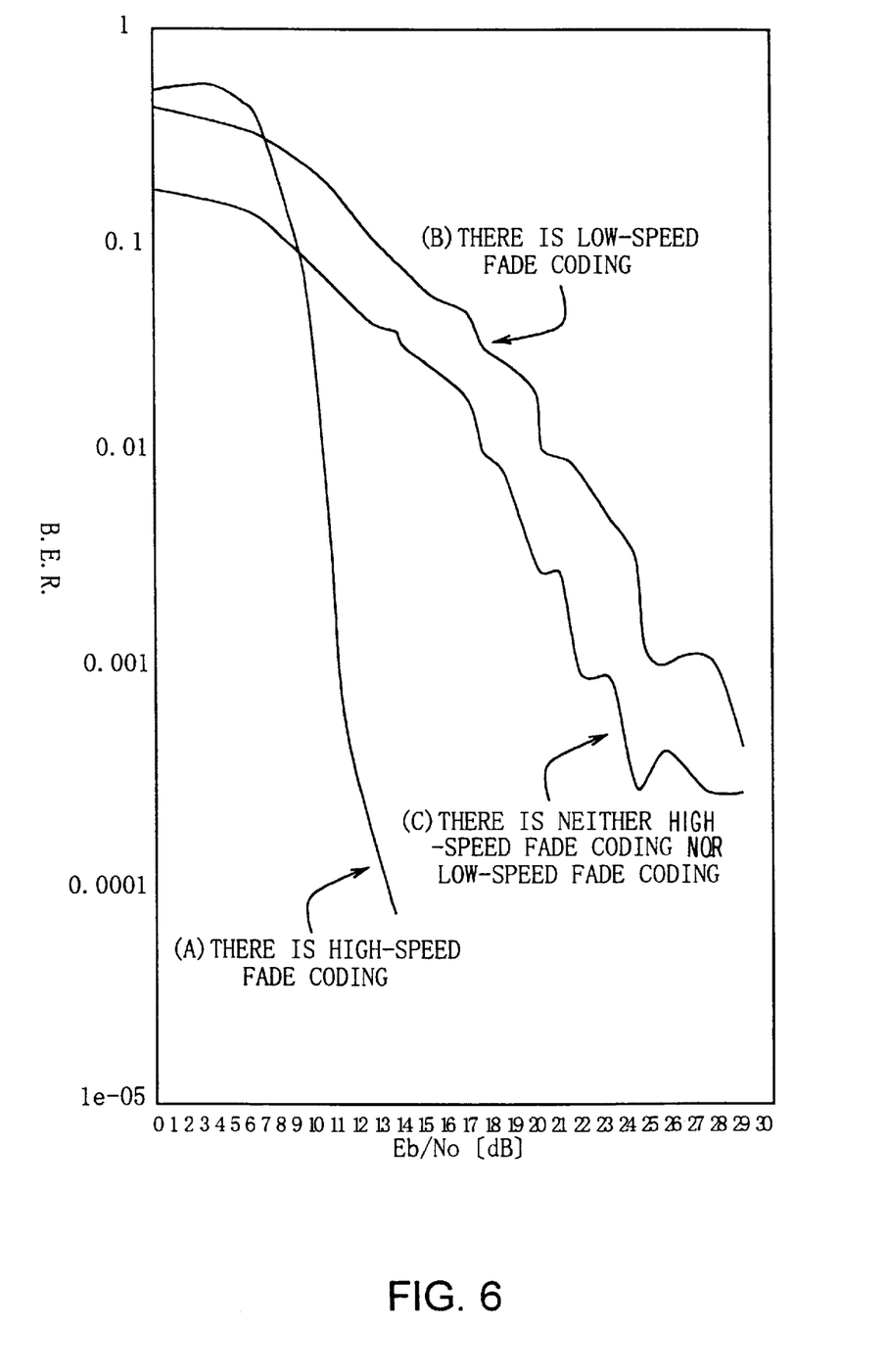
FIG. 6 is a characteristic curvilinear diagram illustrating and describing a comparison of the bit error rate characteristic by difference in fading speed.

FIG. 6 shows the results of computer simulation in the cases where coding for error correcting has been performed and not performed, in the case where high-speed fading with the maximum doppler frequency 1 [kHz] has been performed and the case where low-speed fading with the maximum doppler frequency 10 [Hz] has been performed. Note that, in this figure, the vertical axis represents bit error rate (BER) and the horizontal axis represents signal to noise ratio ($E_b/N_o$).

As shown in FIG. 6, it is found that the case of high speed fading is remarkably improved in the bit error rate characteristic as compared with the case of low speed fading (see (A) and (B) in this figure). Further, it is found that the case of coding for error correcting is remarkably improved in the bit error rate characteristic as compared with the case of not coding (see (A) and (C) in this figure).

As proved in such computer simulation results, by coding to correct an error and generating high-speed fading intentionally, the transmission quality can be kept in good condition.

According to the above structure, in the digital cordless telephone system 1, the transmission data S1 is convolutionally coded and interleaved on the transmitting side when radio communicating, thereby, the data S1 is transmitted so that the emission pattern of the antenna 9 is varied to a cycle faster than the interleave length.

On the other hand, on the receiving side, the radio wave is received and demodulated, and thus obtained reception data S8 is de-interleaved and Viterbi-decoded to restore the data.

With the above, if transmission is performed while changing the emission pattern of the antenna 9 to a higher speed, high-speed fading occurs that is; shorter than the interleave length (see FIG. 5). If the reception level is extremely lowered due to fading in general, burst error occurs at the lower part of the reception level, however, in high speed fading, since the lower part of the reception level is shorter than the interleave length, the burst error can be distributed as random errors by de-interleaving; thus the transmission quality can be kept in good condition.

On the other hand, if data is transmitted without changing the emission pattern as in conventional cases, low-speed fading may occur that is longer than the interleave length when motion speed slows down. In this case, since the lower part of the reception level caused by fading becomes longer than the interleave length, burst errors cannot be distributed as random errors by de-interleaving, as a result, the transmission quality deteriorates.

Therefore, in the case of this embodiment, the antenna 9 capable of changing the emission pattern electrically is provided on the transmitting side. When data is transmitted, the transmission data is interleaved and the emission pattern of the antenna 9 is varied on the cycle faster than the interleave length and the data is transmitted. Thereby, fading faster than the interleave length can be generated. Therefore, on the receiving side, burst errors can be distributed as random errors by de-interleaving, thus the transmission quality of radio communication can be kept in good condition.

In addition to this, in this embodiment, the transmission data is convolutionally coded for error correction and transmitted, and in the receiving side, the reception data is Viterbi-decoded to correct an error, so that distributed random errors can be corrected; thus the bit error rate can be improved and the transmission quality can be kept in better condition.

Further, in this embodiment, since high-speed fading is generated intentionally by changing the emission pattern, local dead point by fading is not generated so that an uncommunicable state can be prevented. In the conventional case, dead point exists locally when a reception signal almost does not reach because the emission pattern is constant so that if the mobile station side stopped at the dead point unfortunately, the station may be in an uncommunicable state. In this embodiment, however, such dead point does not exist since the emission pattern can be varied intentionally, thus it never becomes an uncommunicable state.

Furthermore, in this embodiment, the emission pattern is varied by changing electrically the reactance of the reflection conductor 21 and the waveguide conductor 22, therefore, the structure of antennas can be simplified as compared a method of changing the emission pattern by changing the direction of the antennas mechanically; thus the structure of the device can be simplified as a whole.

In this embodiment, high-speed fading is generated by changing the emission pattern to keep the transmission quality in good condition. Thereby, the cost of a device can be reduced as compared with a method of extending the interleave length as in the conventional case, and also the naturality of communication can be kept. In the method of extending the interleave length, necessary memory capacity becomes large and the cost of a device becomes large, further it is feared that the naturality of communication deteriorates by delay due to interleaving. In this embodiment, however, there is no fear like the above because the interleave length is not varied.

According to the above structure, by providing the antenna 9 which is capable of changing the emission pattern electrically into high speed on the transmission side, the deterioration of transmission quality due to fading can be avoided by generating high-speed fading intentionally, thus radio communication can be performed in good condition. Thereby, a digital cordless telephone system in which fine radio communication can be performed by avoiding the bad influence of fading can be realized with a simple structure.

Note that, in the aforementioned embodiment, the convolutional coding is applied as coding for error correction and the Viterbi decoding is applied as a decoding method. However, the present invention is not limited to this rather also block coding such as BCH (Bose-Chaudhuri-Hocquenghem) coding and block decoding corresponding to that may be applied or convolutional coding and threshold value decoding or sequential decoding may be applied.

Figure 7:
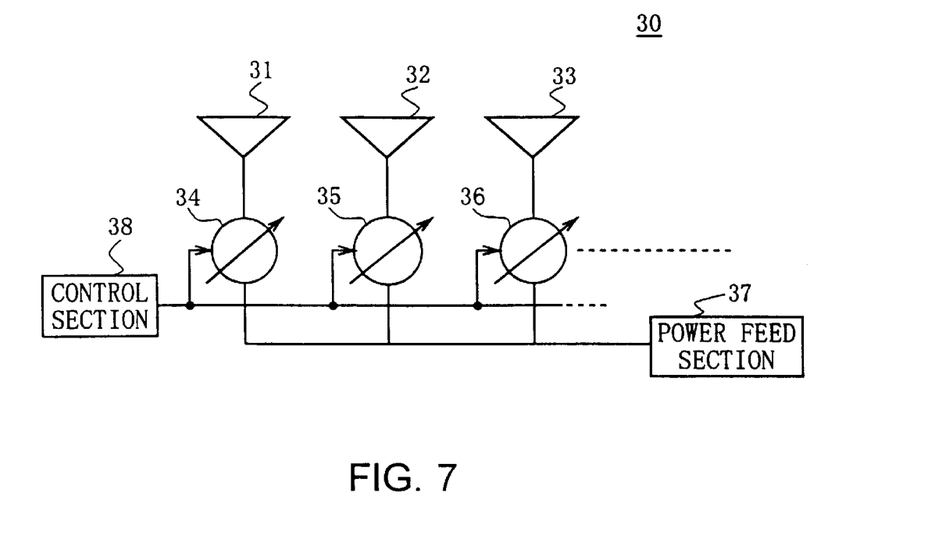
FIG. 7 is a connection diagram showing the structure of an antenna according to another embodiment.

In the aforementioned embodiments, the present invention has been described in the case where the antenna 9 in which the emission pattern is varied by changing the reactance of the reflection conductor 21 and the waveguide conductor 22 is used. However, the present invention is not limited to this but also as shown in FIG. 7, the phased alley antenna 30 may be used that is composed of a plurality of antennas 31–33 each which is positioned in a linear or plane manner; phase shifters 34–36 for electrically controlling the phase for giving oscillation to each antenna 31–33; and a control section 38, which controls the phase of the electric current for giving oscillation to each antenna 31–33 to form a main beam in a desired direction, thus varying the emission pattern. Thereby, the same effects as the above case can be obtained.

Also, in the aforementioned embodiments, the present invention has been described in the case where the antenna 9 capable of electrically changing an emission pattern is provided at the transmitting side. However, the present invention is not limited to this rather the same effects can be obtained also in the case where such antenna is provided at the receiving side. Because it is considered that antennas have the symmetrical characteristic between the transmission characteristic and the reception characteristic in general, thus the same high-speed fading can be generated in the case where the antenna directional characteristic is changed at the receiving side at high speed. In the case where an antenna is provided at the receiving side the transmission signal should be received by the emittive conductor 20 connected to the high frequency circuit 16, and the reactance of the reactance elements 24 and 25 which are connected with the reflection conductor 21 for reflecting the transmission signal and the waveguide conductor 22 for intensifying the antenna directional characteristic in a predetermined direction respectively should be changed by the random signal generator 26 to change the antenna directional characteristic (see FIG. 2).

Furthermore, in the aforementioned embodiments, the present invention has been described in the case where the reactance of the reactance elements 24 and 25 which are connected to the reflection conductor 21 and the waveguide conductor 22 is varied by the random signal generator 26. However, the present invention is not limited to this rather the same effects can be obtained by changing the emission pattern of the antenna as described above by providing control means for controlling the reactance of the reactance elements connected to the reflection conductor and the waveguide conductor.

In the aforementioned embodiments, the present invention has been described in the case where the transmission data is modulated by the DQPSK modulator 7 and the transmission signal with a fixed bandwidth is generated by the high frequency circuit 8. However, the present invention is not limited to this rather the same effects as above can be obtained by providing transmitting means for performing a predetermined modulation on transmission data to generate a transmission signal having a fixed bandwidth.

Further, in the aforementioned embodiments, the present invention has been described in the case where the reception signal frequency is converted to base bandwidth by the high frequency circuit 16 and the data is demodulated by the DQPSK demodulator 17. However, the present invention is not limited to this rather the same effects as above can be obtained by providing receiving means for performing a predetermined demodulation on the reception signal received by a receiving antenna and to store the data.

Figure 8:
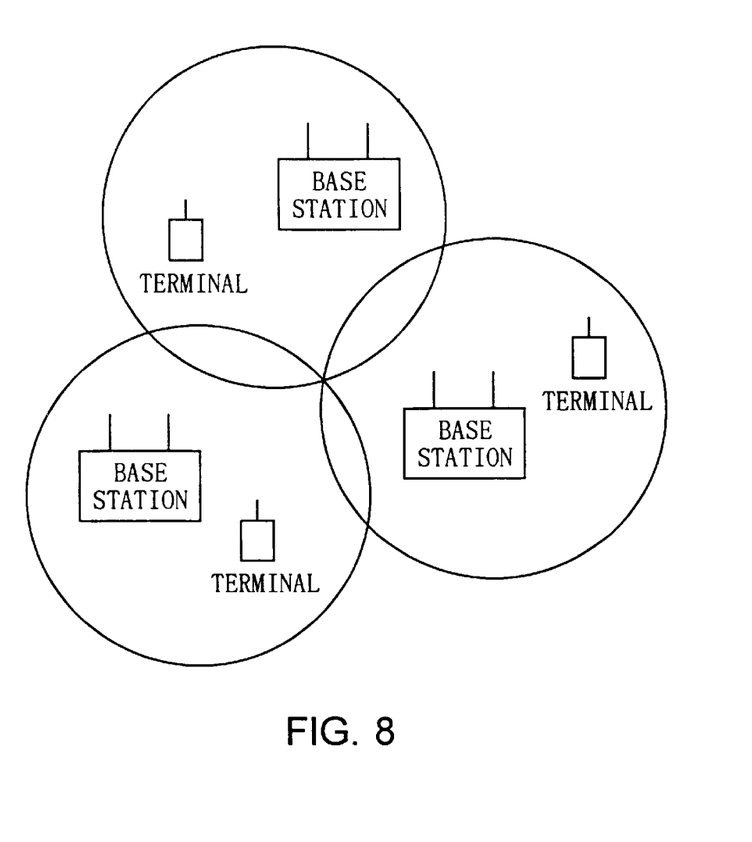
FIG. 8 is a schematic diagram showing an embodiment in the case where the present invention is applied to a base station and a terminal of a radio communication system having cell construction.

Furthermore, in the aforementioned embodiments, the present invention has been described in the case where the present invention is applied to the digital cordless telephone system 1. However, the present invention is not limited to this rather the same effects as above can be obtained in the case where the present invention is applied to another radio communication system such as a portable telephone system. For example, if it is a portable telephone system, the present invention can be applied to both the base station and the terminal device as shown in FIG. 8.

Figure 9:
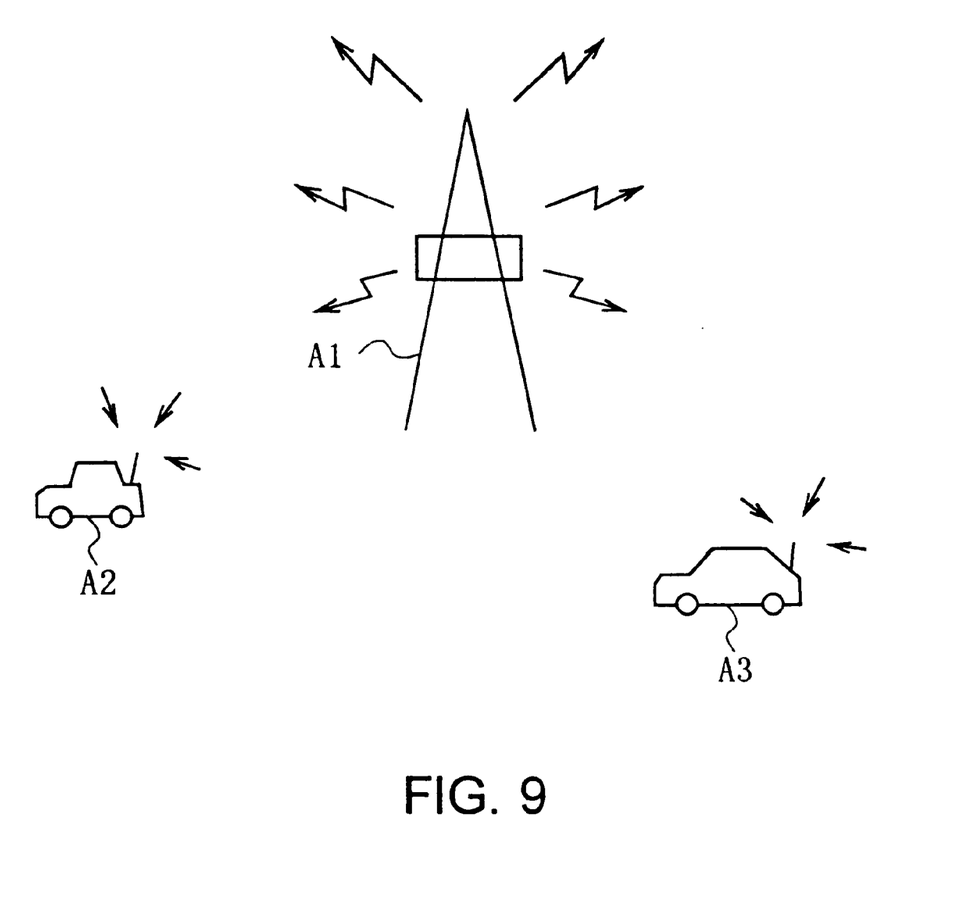
FIG. 9 is a schematic diagram showing an embodiment in the case where the present invention is applied in the transmission and reception of broadcasting.

Also, the present invention can be applied in transmission and reception of broadcasting as shown in FIG. 9. Referring to FIG. 9, a reference numeral A1 denotes a broadcasting station capable of transmitting by applying the present invention. Reference numerals A2 and A3 are receiving stations mounted on automobiles capable of receiving by applying the invention. In this case, the present invention may be applied to the transmitting station only, the receiving station only, or both of these stations.

As described above, according to the present invention, by changing the order of data in each specified period by interleaving means and transmitting it while changing the emission pattern of a transmission antenna on a cycle faster than the specified period, high-speed fading can be generated intentionally. As a result, burst errors caused by the deterioration of the reception level due to fading can be distributed as random errors by de-interleaving means so that radio communication can be performed in good condition In the above manner, a radio communication system and a broadcasting data transmitting and receiving system capable of radio-communicating in good condition by preventing the bad influence by fading can be realized with a simple structure.

While the above has been described in connection with the preferred embodiments of the invention, it will be obvious to those skilled in the art that various changes and modifications may be made, therefore, the appended claims cover all such changes and modifications as fall within the true spirit and scope of the invention.

What is claimed is:

1. A transmitter apparatus comprising:
   interleaving means for interleaving transmission data;
   modulating means for modulating an output signal from said interleaving means; and
   antenna means including means for varying an emission pattern of an antenna, wherein a frequency of varying of said emission pattern is higher than a frequency of interleaving of said interleaving means,
   wherein said means for varying an emission pattern of said antenna includes:
   an emitter for emitting a radio wave;
   a reflector for reflecting said radio wave using a first reactance device;
   a director for directing said radio wave using a second reactance device; and
   reactance control means for controlling a reactance of said first and second reactance devices of said reflector and said director, respectively.

2. The transmitter apparatus as set forth in claim 1, further comprising:
   coding means for performing an error correcting operation on said transmission data and for producing an output signal fed to said interleaving means.

3. The transmitter apparatus as set forth in claim 2, wherein said coding means performs said error correcting operation using convolutional coding.

4. A transceiver apparatus comprising:
   interleaving means for interleaving transmission data;
   modulating means for modulating an output signal from said interleaving means;
   antenna means including means for varying an emission pattern of an antenna, wherein a frequency of varying said emission pattern is higher than a frequency of interleaving of said interleaving means; and
   receiving means for receiving a transmitted radio wave signal, wherein said means for varying said emission pattern of said antenna includes:

an emitter for emitting a radio wave;
a reflector for reflecting said radio wave using a first reactance device;
a director for detecting said radio wave using a second reactance device; and
reactance control means for controlling a reactance of said first and second reactance devices of said reflector and said director, respectively.

5. The transceiver apparatus as set forth in claim 4, further comprisinq:
coding means for performing an error correcting operation on said transmission data and for producing an output signal fed to said interleaving means.

6. The transceiver apparatus as set forth in claim 5, wherein said coding means performs said error correcting operation using convolutional coding.

7. A receiver apparatus comprising:
antenna means for receiving a radio wave and having a varied receiving pattern;
demodulating means for demodulating said radio wave received by said antenna means; and
de-interleaving means for de-interleaving an output signal from said demodulating means,
wherein a frequency of varying of said receiving pattern of said antenna means is higher than a frequency of said de-interleaving of said de-interleaving means,
wherein said antenna means includes:
an emitter for collecting said radio wave;
a reflector for reflecting said radio wave at said emitter using a first reactance device,
a director for directing said radio wave at said emitter using a second reactance device; and
reactance control means for controlling a reactance of said first and second reactance devices of said reflector and said detector, respectively.

8. The receiver apparatus as set forth in claim 7, further comprising:
decoding means for performing an error correcting operation on an output signal from said de-interleaving means.

9. The receiver apparatus as set forth in claim 8, wherein said decoding means performs said error correcting operation using Viterbi decoding.

10. A transceiver apparatus comprising:
transmitter means for transmitting a radio wave;
antenna means at least for receiving a transmitted radio wave signal and having a varied receiving pattern;
demodulating means for demodulating a received radio wave signal received by said antenna means; and
de-interleaving means for de-interleaving an output signal from said demodulating means,
wherein a frequency of varying of said receiving pattern is higher than a frequency of said de-interleaving of said de-interleaving means, wherein said antenna means includes:
an emitter for receiving said radio wave;
a reflector for reflecting said radio wave at said emitter using a first reactance device;
a director for directing said radio wave at said emitter using a second reactance device; and
reactance control means for controlling a reactance of said first and second reactance devices of said reflector and said detector, respectively, to vary said receiving pattern.

11. The transceiver apparatus as set forth in claim 10, further comprising:
decoding means for performing an error correcting operation on an output signal from said de-interleaving means.

12. The transceiver apparatus as set forth in claim 11, wherein said decoding means performs said error correcting operation using Viterbi decoding.

13. A transmitting method comprising:
an interleaving step for interleaving transmission data;
a modulating step for modulating an output signal from said interleaving step; and
a wave emitting step for emitting a radio wave with a varied emission pattern from an antenna, wherein a frequency of varying said emission pattern is higher than a frequency of said interleaving of said interleaving step, wherein said wave emitting step includes:
using an emitter for emitting said radio wave;
reflecting said radio wave at said emitter using a reflector and a first reactance device;
directing said radio wave at said emitter using a director and a second reactance device; and
controlling a reactance of said first and second reactance devices of said reflector and said detector, respectively, using a reactance controller to vary said emission pattern.

14. The transmitting method as set forth in claim 13, further comprising:
a coding step for coding using an error correcting operation on said transmission data and for producing an output signal fed to said interleaving step.

15. The transmitting method as set forth in claim 14, wherein said coding step performs the error correcting operation using convolutional coding.

* * * * *